May 16, 1950   W. J. VAN HEECKEREN   2,508,314
HOT-GAS ENGINE WITH MEANS TO PREVENT
HEATING OF COOLER UPON STOPPAGE
Filed Sept. 10, 1945

Inventor
WILLEM JAN VAN HEECKEREN
By E. F. Wenderoth
Attorney

Patented May 16, 1950

2,508,314

UNITED STATES PATENT OFFICE 2,508,314

HOT-GAS ENGINE WITH MEANS TO PREVENT HEATING OF COOLER UPON STOPPAGE

Willem Jan van Heeckeren, Eindhoven, Netherlands, assignor to Hartford National Bank & Trust Co., Hartford, Conn., as trustee Application September 10, 1945, Serial No. 615,493
In the Netherlands June 16, 1944

Section 1, Public Law 690, August 8, 1946
Patent expires June 16, 1964

4 Claims. (Cl. 60—24)

This invention relates to an improvement in hot-gas engines, and more specifically to apparatus for continuing the cooling of the engine after the heat normally applied to the same has been turned off.

The expression "hot-gas engine" as used herein means a thermo-dynamic power engine, in which a thermo-dynamic cycle is traversed by a quantity of gas which is enclosed in a chamber having a variable volume, which chamber contains or communicates with a heating part, a regenerator and in addition a cooling part which, moreover, is contained or communicates with another chamber having a variable volume. The chamber adjoining the heating part is called the hot chamber, the chamber adjoining the cooling part being called the cold chamber.

Of this quantity of gas, enclosed in the said chambers a part may, if required, be admitted into one or more individual closed tubes or vessels and subsequently be admitted again from one or more of these tubes or vessels into the said chambers. In all these cases the thermodynamic cycle is called a closed cycle.

If desired, the cooling part of the engine may be omitted and replaced by a periodical communication with the open air, in which case a new quantity of air is aspirated for every cycle. Such motors are called engines with open cycle. Both in engines with open cycle and in engines with closed cycle such a phase difference exists between the volume variations of the hot chamber and the cold chamber that the gas is successively subjected to heating, expansion, cooling and compression.

The invention exclusively concerns a hot-gas engine which, during operation must be cooled by means of a cooling medium to be supplied from without, such as water or air, which is always necessary in an engine having a closed cycle.

During operation of a hot-gas engine heat is supplied from a source of heat to the heater of this engine. The heat supplied thereto is for the greater part converted into output power by means of the gas medium circulating in the engine. However, a part of the heat supplied to the heater will reach, by conduction, other parts and including the cooler. This heat is normally carried off by the cooling medium.

If, during operation of the engine, and consequently during the supply of heat by the source of heat, the flow of the cooling medium is interrupted, the temperature of the cooler will increase. Usually coolers are not designed in such a manner as to be capable of withstanding a high temperature, e. g., 300° C. Consequently, interruption of the flow of cooling medium will usually be detrimental to the materials used in the cooler. At the moment at which the engine is stopped and the source of heat is cut off, a certain quantity of heat will still be left in the heater of the engine, which heat keeps flowing to other parts of the engine during this period of rest. If the flow of cooling medium is interrupted simultaneously with the stopping of the engine, the heat flowing to the cooler during this period of rest may cause there a frequently undue temperature increase.

A primary object of this invention is to provide a hot-gas engine with a cooling system positively operating after the fuel to the engine has been cut off.

Another object of this invention is to provide a safety mechanism in a cooling system for a hot-gas engine preventing interruption of the heat dissipating cycle while the engine temperature at the cooler is above a critical value.

Further objects and advantages of the present invention will be apparent from the following description when taken in connection with the drawing.

According to the invention the above problem is met by interrupting the dissipation of heat from the engine a substantial time after interrupting the supply of heat. The heat from the engine heater still reaching the cooler is carried off from the cooler by the continued draining or dissipation of heat, so that the temeparture of this cooler cannot exceed the permissible limit.

The hot-gas engine in which the method according to the invention may be used, is characterized by a device for passing the cooling medium along the cooler of the engine, this device comprising driving means that can be thrown out only after interrupting the supply of heat to the hot-gas engine. This device for feeding forward or aspirating the cooling medium may consist of a pump, either for water or for air, which is driven by a separate motor. The interruptor of this motor may then be locked by the interruptor for the supply of heat in such a manner that the disengagement can take place only in the aforesaid sequence. If the pump for making the cooling medium circulate is driven from the hot-gas engine itself then a free-wheel coupling provided between this pump and the hot-gas engine permits further operation of the pump even after the hot-gas engine has been stopped. When providing the pump with a large rotating mass, either in the form of a separate flywheel or by purposely enlarging the rotating mass of this pump, it may be operated by the power stored in this mass after throwing out the engine.

Figure 1:
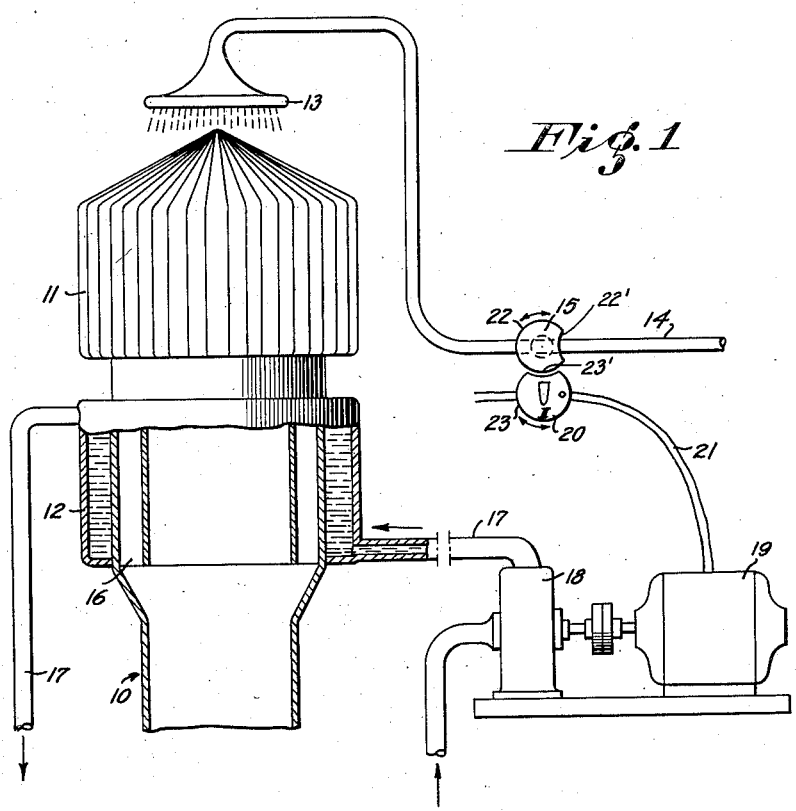
Fig. 1 is a combined schematic diagram and elevation view of a hot-gas engine and its cooling system incorporating a safety mechanism, a partial section of the engine being given to show the path of the cooling medium within the engine.

In Fig. 1 the reference number 10 designates a cylinder of a hot-gas engine which is partly represented in section. An external heater 11 and an external cooler 12 for cylinder 10 are shown in the drawing. An internal cooler 16 is used for cooling the gas circulating in the engine proper. The supply of heat to the engine takes place by means of a burner 13 whose flue gases pass between the ribs of the external heater 11. The fuel for this burner is supplied through a duct 14 comprising a cock 15.

During operation of the hot-gas engine a current or flow of heat is supplied, through the external heater 11, to the cylinder 10 with the gas circulating therein. A large part of the heat supplied is converted into mechanical work or fed to the cooler by means of the thermo-dynamic cyclic process. By conduction from the heater, however, a portion of this heat will reach other parts of the engine including the regenerator, which is usually located between heater and cooler. During operation of the engine a regenerator is periodically heated, at least partly, to a high temperature, so that the supply of heat to this regenerator cannot have detrimental consequences. Upon leaving the regenerator the current of heat will reach the cooler 16 where it will cause a temperature increase. The cooling medium flowing through the external cooler will immediately carry off this heat without the occurrence of any appreciable temperature increase in the cooler.

When the hot-gas engine in question is put out of service, because the driven implement necessitates an interruption of the operation, the supply of heat will generally be stopped at the same moment by the closure of a cock 15 in the fuel duct 14. In this case, however, the heater of the engine still has the operating temperature at the moment of fuel cut off so that a considerable quantity of heat is stored in the external heater 11 as well as in the interior heat exchange parts (not shown) associated therewith. This heat will keep flowing to other motor parts even after stopping the engine. If also the cooling is interrupted simultaneously with the stopping of the engine the temperature of the cooler will increase due to this flow of heat. Since the cooler 16, during normal operation, is not subjected to high temperatures the occurrence of high temperatures will often not be considered in designing the cooler. Various parts of the cooler 12 may be interconnected, for instance, by means of tin solder, so that a temperature of 300° C. and higher is detrimental. The heat passing through the engine might even gain access to other parts of the motor cylinder of the engine, for instance the contact surface of the piston, having a lubricant thereon, which normally does not attain a high temperature during operation of the engine, to produce a detrimental change owing to the presently occurring high temperature.

The aforesaid evils can be cured by cooling of the engine for some substantial time after stopping it and/or after interrupting the supply of heat. To this end a pump 18 forcing the cooling medium through the cooler 12 through a duct 17 is furnished with a driving motor 19 such as an electric motor or any other suitable motor which cannot be thrown out simultaneously with the hot-gas engine because of the particular and novel circulating system to be described hereinafter. An electric lead 21 of the electric motor 19 includes a switch 20 which is mechanically locked in a novel manner by the cock 15 in the fuel duct 14. In effect, the cock 15 has a circular collar 22 with a curved depression 22' which collar engages a similar depression or recess 23' of a collar 23 of the switch 20. The collar 23 being provided with a recess also, mating of the respective recesses may occur only when the position of switch 20 corresponds to a closed position of the cock 15, the open position of cock 15 being shown in the drawing. Consequently, as long as the cock 15 is opened, the switch 20 cannot be disengaged. Moreover, the aforesaid locking has the advantage that the heat supply can only be switched on before the beginning of a working period if the electric motor 19 is switched on so that the cooling medium is already in circulation.

Figure 2:
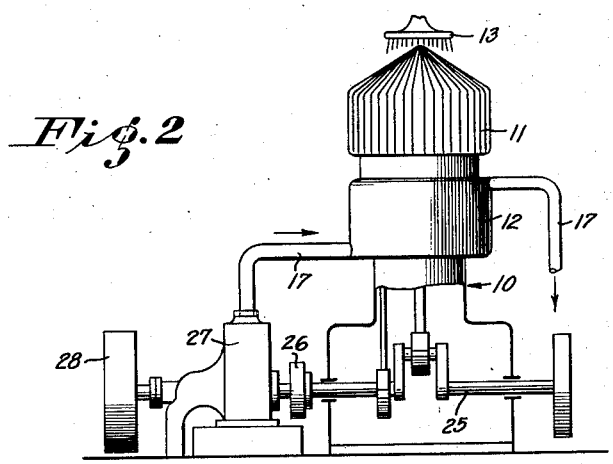
Fig. 2 shows an elevation view of a hot-gas engine and cooling system with its cooler positively operated from a solely mechanical pumping arrangement.

In the form of construction shown in Fig. 2 corresponding parts of the hot-gas engine are denoted by the same reference numerals as in Fig. 1. In the present case, however, a pump 27 for feeding the cooling medium is driven from a crank shaft 25 with the interposition of a free-wheel coupling 26 in a novel arrangement. This free-wheel coupling transmits in the direction of rotation of the crank shaft 25 only a motion of this crank shaft to the shaft of the pump 27. If, consequently, the crank shaft 25 is immobilized from the prime engine heat source, the pump 27 may keep moving in the same direction so that the circulation of the cooling medium keeps on. In this case the driving force for the pump 27 is derived from a large rotating mass which may be housed in the rotating parts of the pump itself or is given the form of a separate flywheel 28 of the pump.

While the forms of the embodiment of the present invention as herein disclosed constitutes preferred forms, it is to be understood that other forms might be adopted, all coming within the scope of the claims which follow.

What I claim is:

1. In a hot gas engine with a closed cycle the combination comprising a heat source, a first control means for said source, a fluid cooled cooler, driving means independent of said engine and said source for circulating a fluid through said cooler, selective control means for said driving means, means interlocking said respective control means in an on-position of said first control means whereby said driving means cannot be stopped while said heat is applied to said engine.

2. In a hot-gas engine with a closed cycle the combination comprising a hot air chamber, a heat generator for the same, fuel conducting means including a valve arrangement coupled to said generator, a heat dissipating device, a circulating system for moving a cooling medium through said device, motivating means independent of said generator for said system, and means for controlling operation of said motivating means, said controlling means including locking means for locking said valve arrangement in one position of said controlling means and unlocking said valve arrangement in another position of said controlling means whereby said valve arrangement is turnable both on and off only when said controlling means is in said another position.

3. In a system for controlling the heat dissipation of a heat motivated engine, the combination of a controllable fuel input to said engine, cooling means for said engine, a prime mover for said cooling means, input means for said prime mover, selective means interposed between said respective inputs, said selective means comprising a pair of movable controls, one for each input, and interlocking means on said controls for preventing shutting down movement of said prime mover input control until after shutting down movement of said fuel input control.

4. In a hot-gas engine the subcombination comprising a first fuel valve, a collar with an inwardly curved arc surface thereon attached to said valve, a prime mover controller, and a second collar with an inwardly curved arc surface thereon attached to said controller, said respective collars being mated during predetermined conditions of engine operation.

WILLEM JAN van HEECKEREN.

REFERENCES CITED

The following references are of record in the file of this patent:

UNITED STATES PATENTS

| Number | Name | Date |
|---|---|---|
| 270,036 | Eimecke et al. | Jan. 2, 1883 |
| 1,662,723 | Snow | Mar. 13, 1928 |
| 2,272,925 | Smith | Feb. 10, 1942 |